US012798593B2

(12) United States Patent
Choi et al.

(10) Patent No.: US 12,798,593 B2
(45) Date of Patent: Nov. 17, 2026

(54) METHOD AND APPARATUS FOR TESTING FORWARD COLLISION-AVOIDANCE ASSIST IN VEHICLE

(71) Applicants: Hyundai Motor Company, Seoul (KR); Kia Corporation, Seoul (KR)

(72) Inventors: Yoon Young Choi, Hwaseong (KR); Cheol Hwan Yun, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 7 days.

(21) Appl. No.: 19/229,039

(22) Filed: Jun. 5, 2025

(65) Prior Publication Data

US 2026/0048752 A1 Feb. 19, 2026

(30) Foreign Application Priority Data

Aug. 19, 2024 (KR) ........................ 10-2024-0110373

(51) Int. Cl.

*B60W 50/029* (2012.01)
*B60W 30/09* (2012.01)
*B60W 50/02* (2012.01)
*G01C 21/28* (2006.01)

(52) U.S. Cl.

CPC .......... *B60W 50/029* (2013.01); *B60W 30/09* (2013.01); *B60W 50/0205* (2013.01); *G01C 21/28* (2013.01); *B60W 2050/0215* (2013.01); *B60W 2720/10* (2013.01)

(58) Field of Classification Search

CPC .................................................. B60W 50/029
See application file for complete search history.

(56) References Cited

U.S. PATENT DOCUMENTS

2026/0048752 A1* 2/2026 Choi ................. B60W 30/0956
2026/0054721 A1* 2/2026 Jang .................. B60W 30/0956

* cited by examiner

*Primary Examiner* — Michael A Berns
(74) *Attorney, Agent, or Firm* — Fox Rothschild LLP

(57) ABSTRACT

A method and apparatus for testing forward collision-avoidance assist are configured to confirm whether forward collision-avoidance assist is properly operated under usual conditions having no collision risk. A method for testing forward collision-avoidance assist of a vehicle includes steps performed by a processor, including: receiving a test mode enter signal; adjusting a detection reference to improve object recognition of the vehicle; changing an operating condition for the forward collision-avoidance assist to operate the forward collision-avoidance assist in a situation in which the vehicle has a low collision risk; and confirming whether the forward collision-avoidance assist is operated, by using the adjusted detection reference and the changed operating condition for the forward collision-avoidance assist.

20 Claims, 6 Drawing Sheets

METHOD AND APPARATUS FOR TESTING FORWARD COLLISION-AVOIDANCE ASSIST IN VEHICLE

CROSS-REFERENCE TO RELATED APPLICATION

This application claims under 35 U.S.C. § 119(a) the benefit of Korean Patent Application No. 10-2024-0110373, filed on Aug. 19, 2024 in the Korean Intellectual Property Office, the entire contents of which are incorporated herein by reference.

BACKGROUND

(a) Technical Field

The present disclosure relates to a method and apparatus for testing forward collision-avoidance assist in a vehicle, more particularly, to the method and apparatus that determine whether forward collision-avoidance assist is properly operated under usual conditions in which there is no collision risk.

(b) Description of the Related Art

Drivers may face numerous unexpected dangerous situations. Therefore, advanced driver assistance systems (ADAS) have been developed to assist driving safety so that a vehicle may determine dangerous situations by itself. The advanced driver assistance systems include lane following assist (LFA), lane keeping assist (LKA), forward collision-avoidance assist (FCA), and the like. These functions assist a driver to more safely drive a vehicle. In the systems, the forward collision-avoidance assist is a driving safety system that warns the driver and controls the vehicle to avoid a collision with a pedestrian or the like in front while the vehicle is driven.

The forward collision-avoidance assist is operated only when there is a high collision risk to prevent malfunctions in a case where the vehicle is not under a collision condition. Therefore, there is a disadvantage that the driver has to take the collision risk to test whether the forward collision-avoidance assist is normally operated. In some cases, accidents may occur during tests in uncontrolled situations. As a result, it is difficult to confirm whether the forward collision-avoidance assist is properly operated under usual conditions having no collision risk.

SUMMARY

The present disclosure provides a method and an apparatus for testing forward collision-avoidance assist to confirm whether a forward collision-avoidance assist system and/or function (hereinafter simply referred to as "collision-avoidance assist") is properly operated under usual conditions having no collision risk, by using a test mode in which operating conditions of the forward collision-avoidance assist are mitigated.

The problems to be solved by the present disclosure are not limited to the above-described problems, and other problems which are not described herein will be clearly understood by those skilled in the art from the description below.

According to the present disclosure, a method for testing forward collision-avoidance assist of a vehicle includes: receiving, by at least one processor, a test mode enter signal; adjusting, by the at least one processor, a detection reference to improve object recognition of the vehicle; changing, by the at least one processor, an operating condition for the forward collision-avoidance assist to operate the forward collision-avoidance assist in a situation in which the vehicle has a low collision risk; and confirming, by the at least one processor, whether the forward collision-avoidance assist is operated, by using the adjusted detection reference and the changed operating condition for the forward collision-avoidance assist.

Another embodiment of the present disclosure provides an apparatus for testing forward collision-avoidance assist of a vehicle, the apparatus comprising: at least one memory that stores instructions; and at least one processor, wherein the at least one processor executes the instructions for causing the processor to: receive a test mode enter signal, adjust a detection reference to improve object recognition of the vehicle, change an operating condition for the forward collision-avoidance assist to operate the forward collision-avoidance assist in a situation where the vehicle has a low collision risk, and confirm whether the forward collision-avoidance assist is operated, by using the adjusted detection reference and the changed operating condition for the forward collision-avoidance assist.

According to an embodiment of the present disclosure, since a test mode in which operating conditions of forward collision-avoidance assist are mitigated is used, there is an advantageous effect in that whether the forward collision-avoidance assist is properly operated under usual conditions having no collision risk can be confirmed.

According to the embodiment of the present disclosure, since the test mode in which the operating conditions of the forward collision-avoidance assist are mitigated, there is an advantageous effect of reducing collision risks which may occur during a test.

A non-transitory computer-readable recording medium storing computer-executable instructions that, when executed by at least one processor, cause the at least one processor to: receive a test mode enter signal, adjust a detection reference to improve object recognition of the vehicle, change an operating condition for the forward collision-avoidance assist to operate the forward collision-avoidance assist in a situation in which the vehicle has a low collision risk, and confirm whether the forward collision-avoidance assist is operated, by using the adjusted detection reference and the changed operating condition for the forward collision-avoidance assist.

The advantageous effects of the present disclosure are not limited to the above-described advantageous effects, and other advantageous effects which are not described herein will be clearly understood by those skilled in the art from the description below.

DETAILED DESCRIPTION

Figure 1:
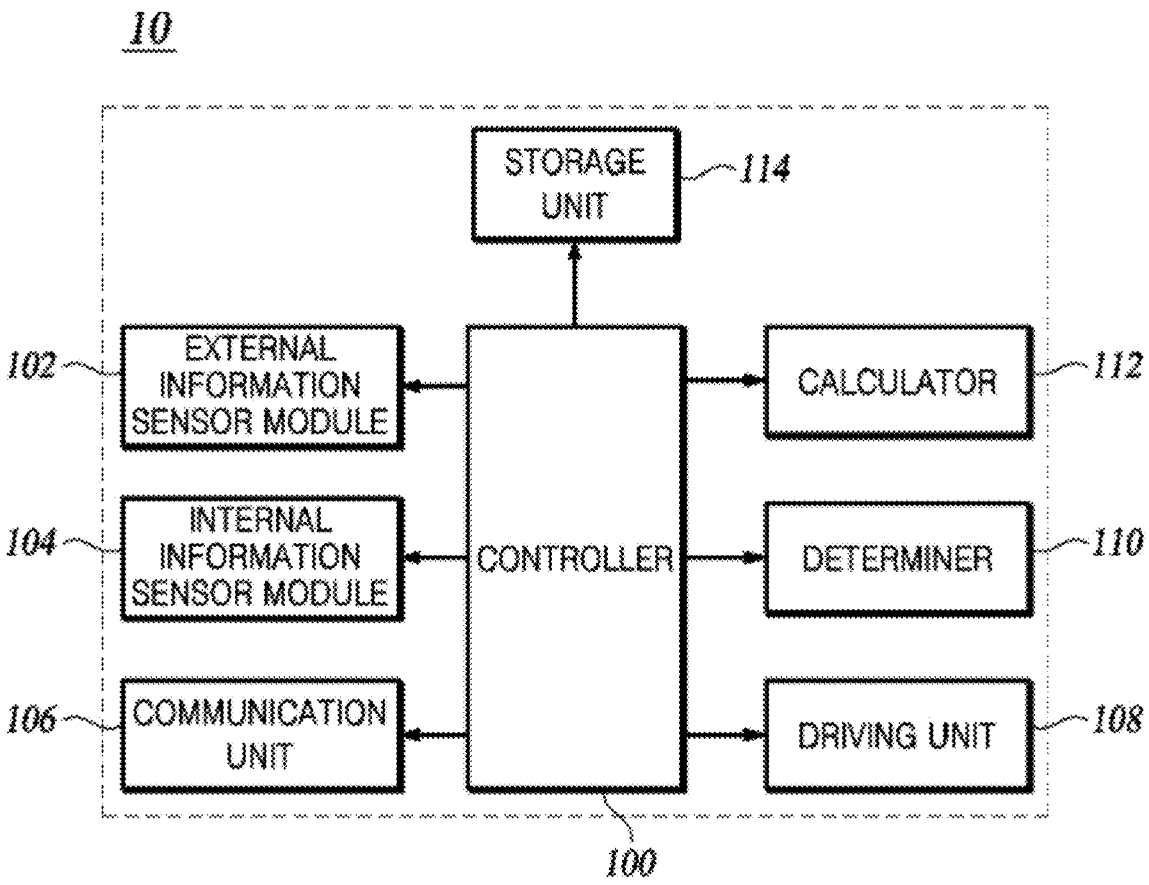
FIG. 1 is a configuration diagram of an apparatus for testing forward collision-avoidance assist according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

FIG. 1 is a configuration diagram of an apparatus for testing forward collision-avoidance assist according to an embodiment of the present disclosure.

Referring to FIG. 1, a forward collision-avoidance assist test apparatus (10) includes a controller (100), a calculator (112), and a determiner (110). The controller (100), the calculator (112), and the determiner (110) may be realized as a single apparatus including at least one processor and at least one memory. The forward collision-avoidance assist test apparatus (10) may further include at least one of an external information sensor module (102), an internal information sensor module (104), a communication unit (106), a driving unit (108), and a storage unit (114). The forward collision-avoidance assist test apparatus (10) may further include an HMI display unit (not shown) separately installed inside a vehicle to display an image for forward collision-avoidance assist.

Components of the forward collision-avoidance assist test apparatus (10) may exchange signals or data via an internal communication system of a vehicle. The internal communication system of the vehicle may utilize at least one communication protocol (for example, MAY, LIN, FlexRay, MOST, and Ethernet).

The forward collision-avoidance assist test apparatus (10) may be mounted on a vehicle.

The external information sensor module (102) may obtain external information of the vehicle. The external information of the vehicle may include information on a location of an external object, a speed of the external object, a moving direction of the external object, and a type of the external object. The type of the external object is one of another vehicle, a pedestrian, or an obstacle. The external information sensor module (102) may transmit the external information of the vehicle to the calculator (112). The external information sensor module (102) may include a radar, an infrared sensor, a camera, a light detection and ranging (LiDAR), an ultrasonic sensor, and the like. For example, the external information sensor module (102) is a laser sensor, and may accurately measure a positional relationship between the vehicle and the object by using a time-of-flight (TOF) and/or a phase-shift. The external information sensor module (102) may detect an object located in at least one region of a front region, a rear region, a left region, and a right region of the vehicle by using a sensor. The sensor may be disposed in various locations of the vehicle. The sensor may be disposed in at least one location of the front region, the rear region, the left region, the right region, or a ceiling of a vehicle body. When there are a plurality of objects, the external information sensor module (102) may simultaneously sense the plurality of objects.

When a test mode is activated, the external information sensor module (102) may improve object recognition by setting object detection sensitivity to be higher than object detection sensitivity when the test mode is not activated. As an example, when the object is detected by using the radar or the LiDAR, the object recognition may be improved by adjusting a detection reference including the number and a size of the object, and signal strength. As another example, when the object is detected by using the camera, the object recognition may be improved by adjusting a frame retention period or a reliability level.

The camera may collect images in front of the vehicle. The images collected by the camera may include images of a road or the object. The images collected by the camera may be processed by the controller (100). On the other hand, the camera may directly include an image sensor and an image processing module, and the image processing module may process the collected images. In this case, the image processing module may process still images or moving images acquired through the image sensor, and may extract required image information. The camera may transmit the extracted image information to the controller (100). The camera may include a charge-coupled device (CCD) image sensor or a complementary metal oxide semiconductor (CMOS) image sensor. The camera may also include a three-dimensional space recognition sensor such as a KINECT (RGB-D sensor), a TOF (structured light sensor), a stereo camera, and the like. When there are a plurality of cameras, the plurality of cameras may be installed in various locations of the vehicle. For example, each of the cameras may be disposed in at least one location of a left side, a rear side, a right side, a front side, a ceiling, an inner side, or an outer side of the vehicle.

The internal information sensor module (104) may obtain vehicle internal information. The vehicle internal information may include a location and a current speed of the vehicle, a vehicle moving direction, and acceleration. The internal information sensor module (104) may transmit the vehicle internal information to the calculator (112). The internal information sensor module (104) may include an acceleration sensor, a yaw rate sensor, a torque measuring sensor, a wheel speed sensor, and a steering angle sensor.

The controller (100) controls at least one of the external information sensor module (102), the internal information sensor module (104), the calculator (112), the determiner (110), the communication unit (106), the driving unit (108), or the storage unit (114). The control unit (100) may perform vehicle control by controlling other components.

The communication unit (106) communicates with an internal device, an external device, or other vehicles. The communication unit (106) may receive a test mode enter signal of the forward collision-avoidance assist from the internal device. For example, the test mode enter signal may be generated by consecutively inputting the signal multiple times through a specific key or by using a test mode dedicated switch. The internal device may include a hardware switch, a user setting mode (USM) switch, and the like. The communication unit (106) may transmit the test mode enter signal to the controller (100).

The communication unit (106) may receive the test mode enter signal of the forward collision-avoidance assist from the external device. The external device may include a diagnostic device, a personal computer (PC), and the like. The communication unit (106) may transmit the test mode enter signal to the controller (100).

The communication unit (106) may receive driving information from other vehicles. The driving information includes a location, a speed, acceleration, a direction, a predicted path, path history, a type, and the like of the other vehicles.

The communication unit (106) may include an internal communication unit and an external communication unit. The internal communication unit may transmit or receive data by using various communication protocols. Here, the communication protocol may include at least one of controller area network (MAY), MAY with flexible data rate (MAY FD), Ethernet, local interconnect network (LIN), and FlexRay. The communication protocol may include other protocols for communication between various devices mounted on the vehicle. The external communication unit may perform vehicle-to-vehicle (V2V) communication with other vehicles or vehicle-to-infrastructure (V2I) communication with an infrastructure system. For example, the infrastructure may be a roadside unit or a server that periodically transmits traffic information in conjunction with a transportation information system (TIS), an intelligent transport system (ITS), or the like. In addition, the external communication unit may perform vehicle-to-everything (V2X) communication. The external communication unit may utilize various communication methods such as a vehicular ad hoc network (VANET), wireless access in vehicular environments (WAVE), dedicated short range communication (DSRC), communication access in land mobile (CALM), vehicle-to-network (V2N), wireless LAN (WLAN) communication, wireless-fidelity (Wi-Fi) communication, wireless broadband (WiBro) communication, long term evolution (LTE) communication, long term evolution-advanced (LTE-A) communication, 5G communication, 6G communication, ultra wideband (UWB) communication, ZigBee communication, near field communication (NFC), and the like. The communication unit (106) may include at least one of a transmitting antenna, a receiving antenna, a radio frequency (RF) circuit which may realize various communication protocols, and an RF element.

The driving unit (108) may include a steering device, a braking device, an accelerator device, and the like. The driving unit (108) may control a direction or a speed of the vehicle in accordance with a command from the controller (100).

The storage unit (114) stores programs and information which are required for testing the forward collision-avoidance assist. The storage unit (114) may store vehicle exterior information acquired by the exterior information sensor module (102), vehicle interior information acquired by the interior information sensor module (104), information generated by the calculator (112) and the determiner (110), and information received by the communication unit (106).

The controller (100) may start or end the test mode by receiving the test mode enter signal. The controller (100) may end the test mode when a test mode retention time elapses. The controller (100) may complete the test mode when a current vehicle speed is lower than a minimum operation vehicle speed.

The controller (100) may receive a collision warning signal, and may transmit the warning signal to an HMI device. The HMI device may include a display, a dashboard, an amplifier, a buzzer, and a haptic module. The HMI device may transmit a warning status and a control status to a driver.

The determiner (110) may compare a calculated TTC and a reference TTC to determine a collision risk. The determiner (110) may transmit a collision warning signal and/or a control signal to the controller (100), based on the collision risk. The determiner (110) may compare the current vehicle speed and the minimum operation vehicle speed. The determiner (110) may determine whether or not the test mode exceeds the test mode retention time.

The calculator (112) may calculate a time-to-collision (TTC) representing a time required for the vehicle to collide with the object. The TTC is calculated, based on a distance between the vehicle and the object and a current speed of the vehicle.

The reference TTC for vehicle control may be separately set in advance. The reference TTC may be stored in the storage (114). As an example, at least one of the reference TTC for a warning output, the reference TTC for controlling a braking device, or the reference TTC for emergency braking control may be set. For example, the reference TTC for the warning output may be set to 2.0 seconds, the reference TTC for controlling the braking device may be set to 1.5 seconds, and the reference TTC for the emergency braking control may be set to 0.5 seconds.

The controller (100) compares the calculated TTC and the reference TTC, and controls the vehicle, based on a comparison result. Here, the vehicle control includes at least one of the warning output, controlling the steering device, or controlling the braking device. As an example, when the calculated TTC is smaller than the reference TTC for controlling the braking device, the controller (100) may decelerate the vehicle.

According to the above-described configurations, the forward collision-avoidance assist test apparatus (10) may confirm whether the forward collision-avoidance assist is properly operated under usual conditions having no collision risk.

Figure 2A:
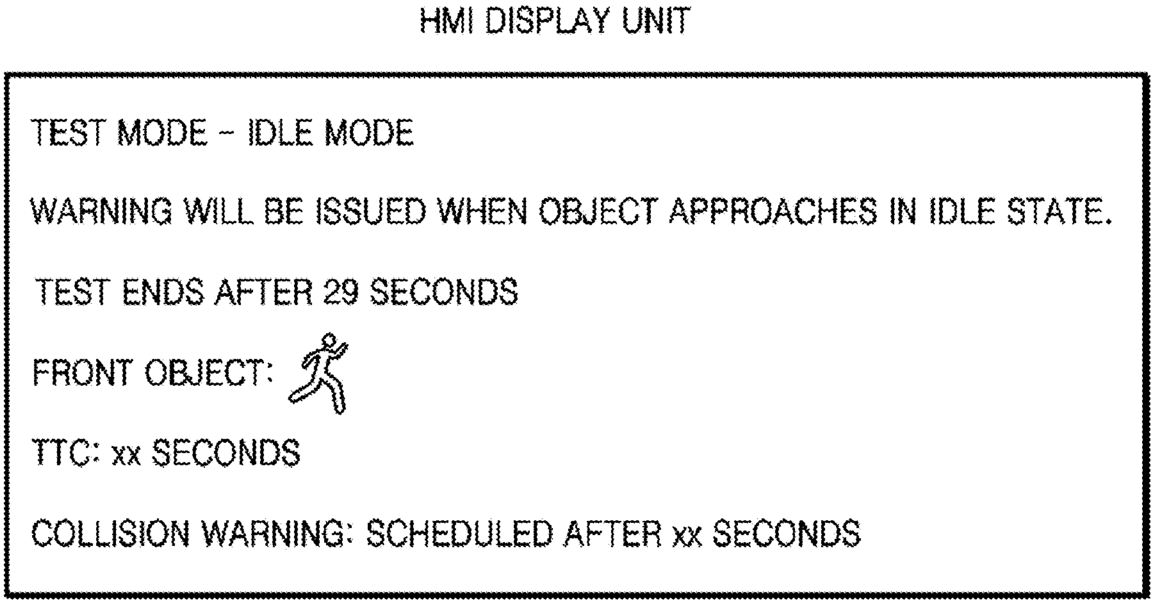
FIGS. 2A and 2B are exemplary views for describing a screen displayed on an HMI display unit when a test mode according to the embodiment of the present disclosure is performed.

FIG. 2A is an exemplary view for describing a screen displayed on an HMI display unit when the test mode according to the embodiment of the present disclosure is performed.

Figure 2B:
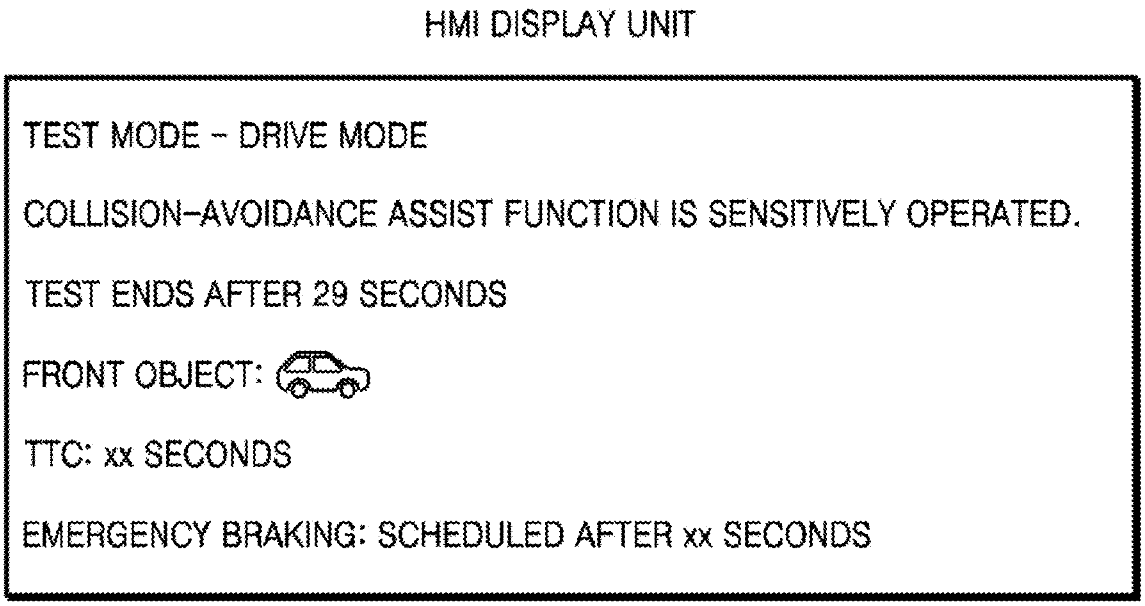

FIG. 2B is an exemplary view for describing a screen displayed on the HMI display unit when the test mode according to the embodiment of the present disclosure is performed.

When the communication unit (106) receives the test mode enter signal, the test mode starts. The test mode may include an idle mode and a drive mode.

The test mode enter signal may be received from the external device. For example, the test mode enter signal in the idle mode may be received by using a vehicle diagnostic device.

The test mode enter signal may be transmitted by the internal device. The test mode enter signal may be generated by consecutively inputting the signal multiple times through a specific key or by using a test mode dedicated switch. For example, when a tester consecutively turns the test mode dedicated switch on/off 30 times, the internal device may generate the test mode enter signal.

When the test mode starts, test mode operation information may be displayed on the HMI display unit. The test mode operation information may include mode information, timer information, front object information, TTC information, warning schedule information, and braking schedule information. The mode information is information indicating whether a current test mode is in the idle mode or in the drive mode. The timer information is information indicating a time remaining until the test mode ends. The front object information is information indicating a type of an external object. The TTC information is information indicating an estimated time remaining until the vehicle collides with a preceding vehicle or the external object. The warning schedule information is information indicating a time remaining until the collision warning. The braking schedule information is information indicating a time remaining until the emergency braking.

Table 1 provides examples of operating conditions that are changed when the test mode is performed.

TABLE 1

| | Normal Mode | Idle Mode | Drive Mode |
|---|---|---|---|
| Minimum Operation Vehicle Speed | 10 km/h or higher | 0 km/h (acceleration unavailable) | 1 km/h |
| Reference TTC | reference TTC for warning output: 2.0 seconds<br>reference TTC for controlling braking device: 1.5 seconds<br>reference TTC for emergency braking control: 1.0 second | reference TTC for warning output: 10.0 seconds<br>reference TTC for controlling braking device: —<br>reference TTC for emergency braking control: — | reference TTC for warning output: 5.0 seconds<br>reference TTC for controlling braking device: —<br>reference TTC for emergency braking control: 5.0 seconds |
| Retention Time | no limit | 30 seconds | 30 seconds |

The forward collision-avoidance assist is operated only when there is a high collision risk to prevent malfunctions in a case where the vehicle is not under a collision condition. The forward collision-avoidance assist is set not to be operated at a specific speed or lower. This speed is referred to as the minimum operation vehicle speed. For example, in a normal mode, the forward collision-avoidance assist is set to be operated only when the vehicle speed is 10 km/h or higher.

In the normal mode of the forward collision-avoidance assist, for example, a reference TTC value is divided into three stages, and in each stage, a collision warning is issued to the driver to control the vehicle. As an example, at least one of the reference TTC for a warning output, the reference TTC for controlling the braking device, or the reference TTC for emergency braking control may be set. In the normal mode, the reference TTC for the warning output may be set to 2.0 seconds, for example, the reference TTC for controlling the braking device may be set to 1.5 seconds, for example, and the reference TTC for the emergency braking control may be set to 0.5 seconds, for example.

The controller (100) controls the vehicle by comparing the calculated TTC and the reference TTC. Here, the vehicle control includes at least one of the warning output, controlling the steering device, or controlling the braking device. For example, when the calculated TTC is smaller than the reference TTC for the warning output, the controller (100) may issue the collision warning to the driver. When the calculated TTC is smaller than the reference TTC for controlling the braking device, the controller (100) may decelerate the vehicle. When the calculated TTC is smaller than the reference TTC for the emergency braking control, the controller (100) may control the vehicle to perform the emergency braking, or may control the vehicle to perform the steering to avoid the collision. The normal mode of the forward collision-avoidance assist has no time limit.

The controller (100) forcibly stops the vehicle when the idle mode of the test mode starts. The idle mode is a test mode applied when a pedestrian approaches in a state where the vehicle is stopped. Since the state where the vehicle is stopped is used, the driver may confirm whether the forward collision-avoidance assist is properly operated under conditions having no collision risk.

The controller (100) changes the minimum operation vehicle speed at which the forward collision-avoidance assist may be operated to 0 km/h. For example, the controller (100) may change the minimum operation vehicle speed from 10 km/h to 0 km/h. The forward collision-avoidance assist may be operated by changing the minimum operation vehicle speed, even when the vehicle is stopped. The determiner (110) may compare the current vehicle speed and the minimum operation vehicle speed. When the current vehicle speed is lower than the minimum operation vehicle speed, the controller (100) may complete the test mode.

For example, the reference TTC for the warning output in the idle mode may be set to 10.0 seconds. In the idle mode, the reference TTC for controlling the braking device and the reference TTC for the emergency braking control are not set.

When the calculated TTC is smaller than the reference TTC for the warning output, the controller (100) may issue the collision warning to the driver.

The controller (100) may set the retention time of the test mode. For example, the retention time of the idle mode may be set to 30 seconds. The controller (100) may complete the idle mode when the retention time elapses.

Here, the minimum operation vehicle speed, the reference TTC, the mode, the retention time, and the like are merely examples, and the test method is not limited thereto.

When the drive mode of the test mode starts, the minimum operation vehicle speed at which the forward collision-avoidance assist may be operated is changed to a lower value. For example, the controller (100) may change the minimum operation vehicle speed from 10 km/h to 1 km/h. Even at a slow speed, the forward collision-avoidance assist may be operated by changing the minimum operation vehicle speed at which the forward collision-avoidance assist may be operated. The determiner (110) may compare the current vehicle speed and the minimum operation vehicle speed. When the current vehicle speed is lower than the minimum operation vehicle speed, the controller (100) may complete the test mode.

In the drive mode, the reference TTC for the warning output may be set to 5.0 seconds, for example, and the reference TTC for the emergency braking control may be set to 5.0 seconds, for example.

When the calculated TTC is smaller than the reference TTC for the warning output, the controller (100) may issue the collision warning to the driver. When the calculated TTC is smaller than the reference TTC for the emergency braking control, the controller (100) may control the vehicle to perform the emergency braking, or may control the vehicle to perform the steering to avoid a collision.

The controller (100) may set the retention time of the test mode. For example, the retention time of the drive mode may be set to 30 seconds. The controller may complete the drive mode when the retention time elapses.

Here, values of the minimum operation vehicle speed, the reference TTC, and the retention time values are merely examples, and the test method is not limited thereto.

Figure 3:
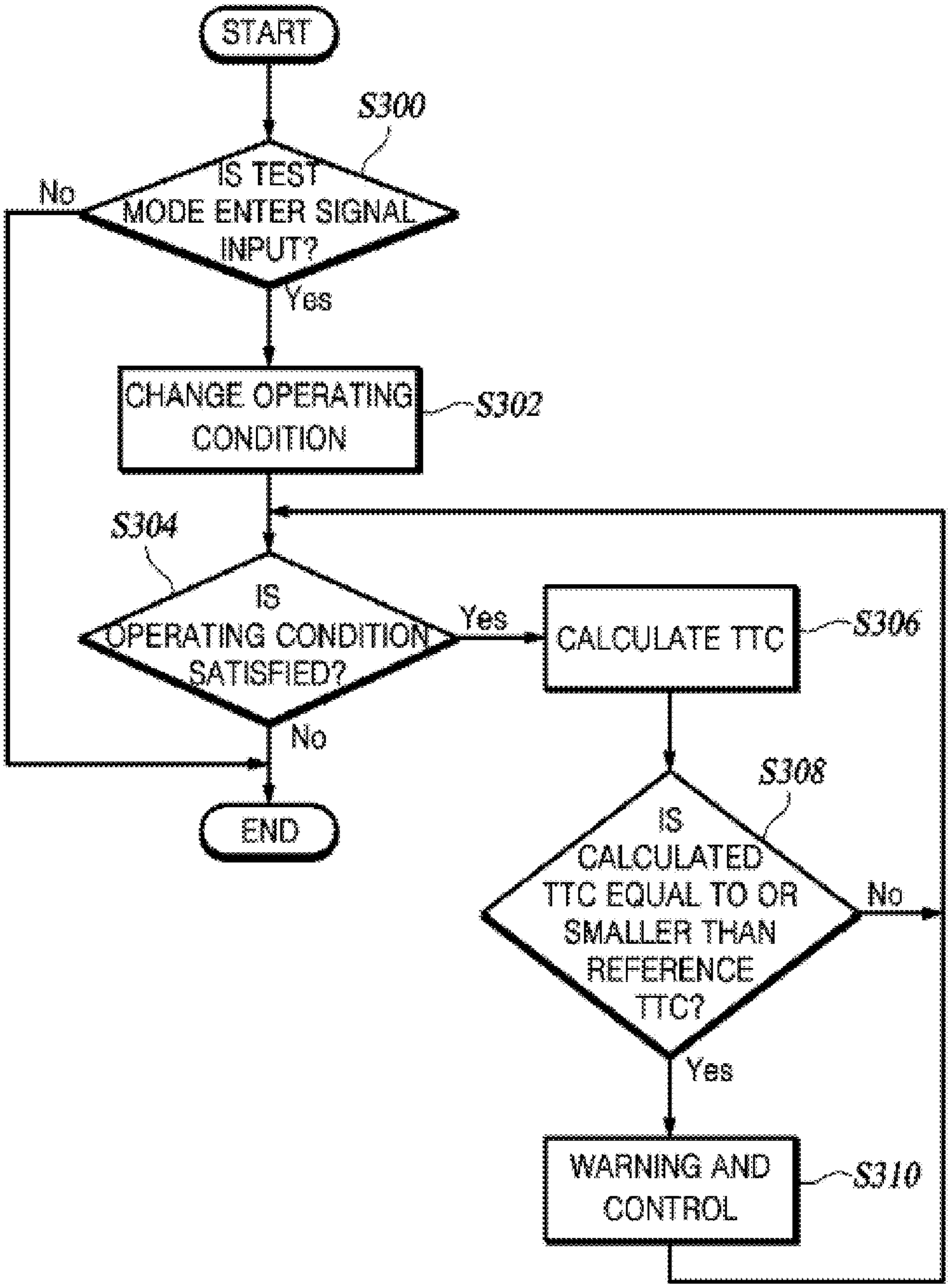
FIG. 3 is a flowchart for describing an operation process of the test mode according to the embodiment of the present disclosure.

FIG. 3 is a flowchart for describing an operation process of the test mode according to the embodiment of the present disclosure.

The controller (100) determines whether the test mode enter signal is input (S300). When the test mode enter signal is input, the test mode starts. When the test mode enter signal is not input, the test mode ends. When the test mode starts, the controller (100) provides test mode operation information to an inspector by using the HMI display unit. The test mode operation information may include mode information, timer information, front object information, TTC information, warning schedule information, and braking schedule information.

The controller (100) may set the retention time of the test mode. For example, when the test mode starts, a 30-second timer is operated. The controller (100) may complete the test mode when the retention time elapses.

When the test mode starts, the controller (100) changes the operating conditions of the forward collision-avoidance assist function (S302). The operating conditions may include the minimum operation vehicle speed and the reference TTC. The minimum operation vehicle speed means a minimum vehicle speed condition under which the forward collision-avoidance assist may be operated. The reference TTC means a minimum TTC condition under which the forward collision-avoidance assist may be operated.

The controller (100) and/or the determiner (110) determines whether the test mode operating condition is satisfied (S304). When the test mode operating condition is satisfied, the TTC is calculated. When the test mode operating condition is not satisfied, the test mode ends. For example, in order to calculate the TTC in the idle mode, the current vehicle speed has to be 0 km/h, or the retention time does not have to exceed 30 seconds. On the other hand, when the current vehicle speed is not 0 km/h and the retention time exceeds 30 seconds, the TCC is not calculated. In other words, when either the current vehicle speed is 0 km/h or the retention time does not exceed 30 seconds, the TCC may be calculated.

In order to calculate the TTC in the drive mode, the current vehicle speed does not have to exceed 1 km/h, or the test mode time does not have to exceed 30 seconds. On the other hand, when the current vehicle speed is 1 km/h or lower and the test mode time exceeds 30 seconds, the TCC is not calculated. In other words, when the current vehicle speed exceeds 1 km/h or the test mode time does not exceed 30 seconds, the TCC may be calculated.

The determiner (110) may compare the current vehicle speed and the minimum operation vehicle speed. When the current vehicle speed is lower than the minimum operation vehicle speed, the controller (100) may complete the test mode.

The calculator (112) may calculate the TTC representing a time required for the vehicle to collide with the object (S306). The TTC is calculated by using the vehicle external information and the vehicle internal information. The external information sensor module (102) may obtain the vehicle external information. The internal information sensor module (104) may obtain the vehicle internal information. The calculator (112) may transmit the calculated TTC to the determiner (110).

The determiner (110) may compare the calculated TTC and the reference TTC to determine the collision risk (S308). The determiner (110) may transmit a warning signal and/or a control signal to the controller (100), based on the collision risk.

The controller (100) controls the vehicle in accordance with the warning signal and/or the control signal (S310). Here, the vehicle control includes at least one of the warning output, controlling the steering device, or controlling the braking device.

Figure 4:
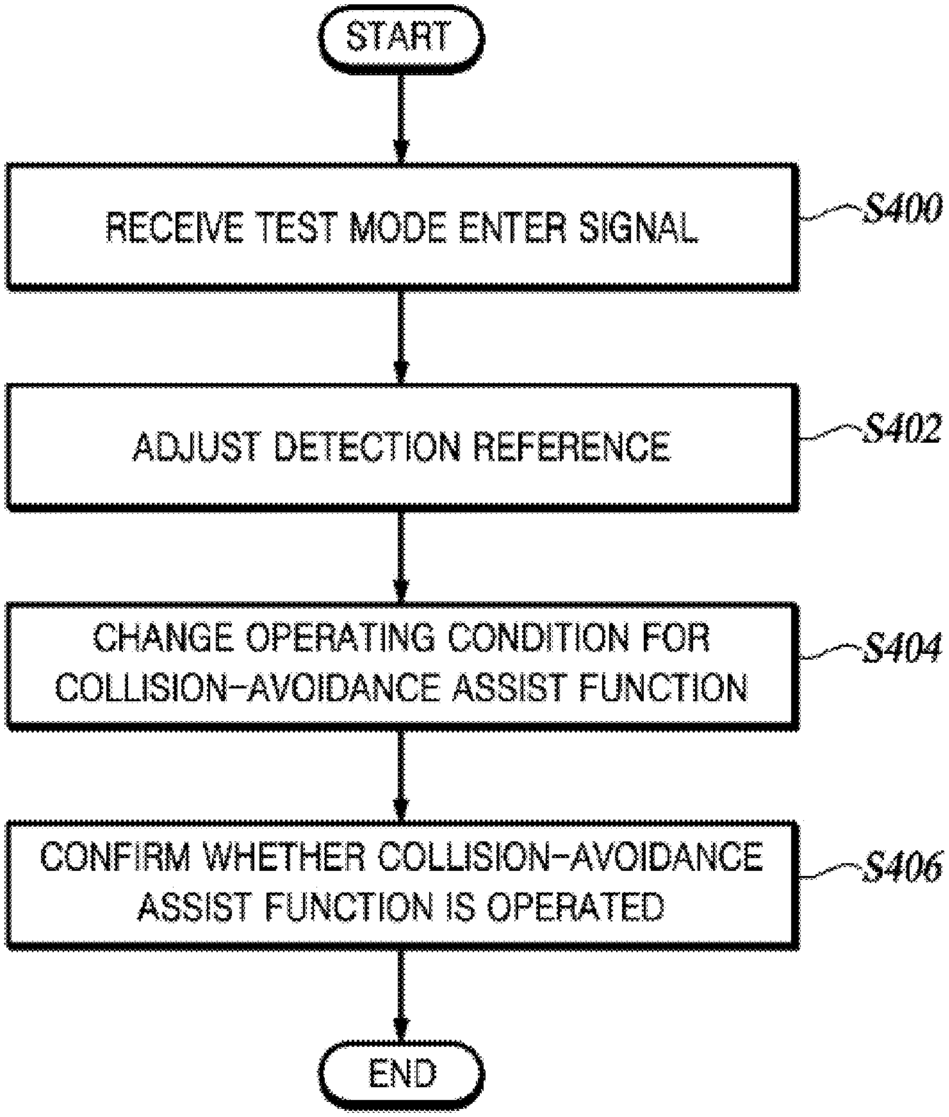
FIG. 4 is a flowchart of a method for testing the forward collision-avoidance assist according to the embodiment of the present disclosure.

FIG. 4 is a flowchart of a method for testing the forward collision-avoidance assist according to the embodiment of the present disclosure.

Referring to FIG. 4, the forward collision-avoidance assist test apparatus (10) may receive the test mode enter signal from the external device or the internal device (S400). When the forward collision-avoidance assist test apparatus (10) receives the test mode enter signal, the test mode starts.

When the test mode is activated, the forward collision-avoidance assist test apparatus (10) may adjust the detection reference to more sensitively recognize the object by increasing the object detection sensitivity than the object detection sensitivity in basic setting of the normal mode (S402). As an example, the forward collision-avoidance assist test apparatus (10) may more sensitively recognize the object by adjusting the detection reference including the number, a size, and signal intensity of the object in detecting the object by using the radar or the LiDAR. As another example, in detecting the object by using the camera, the object may be more sensitively recognized by adjusting a frame retention period or a reliability level.

The forward collision-avoidance assist test apparatus (10) may change the operating condition of the forward collision-avoidance assist (S404). As an example, the minimum operation vehicle speed and the reference TTC may be changed. The minimum operation vehicle speed means the minimum vehicle speed condition under which the forward collision-avoidance assist may be operated. The reference TTC means the minimum TTC condition under which the forward collision-avoidance assist may be operated.

The forward collision-avoidance assist test apparatus (10) may confirm whether the forward collision-avoidance assist is properly operated, based on the changed operating condition (S406). As an example, the forward collision-avoidance assist test apparatus (10) may determine the collision risk by comparing the calculated TTC and the reference TTC. When the calculated TTC is smaller than the reference TTC, the forward collision-avoidance assist test apparatus (10) may warn the driver or may control the vehicle.

Figure 5:
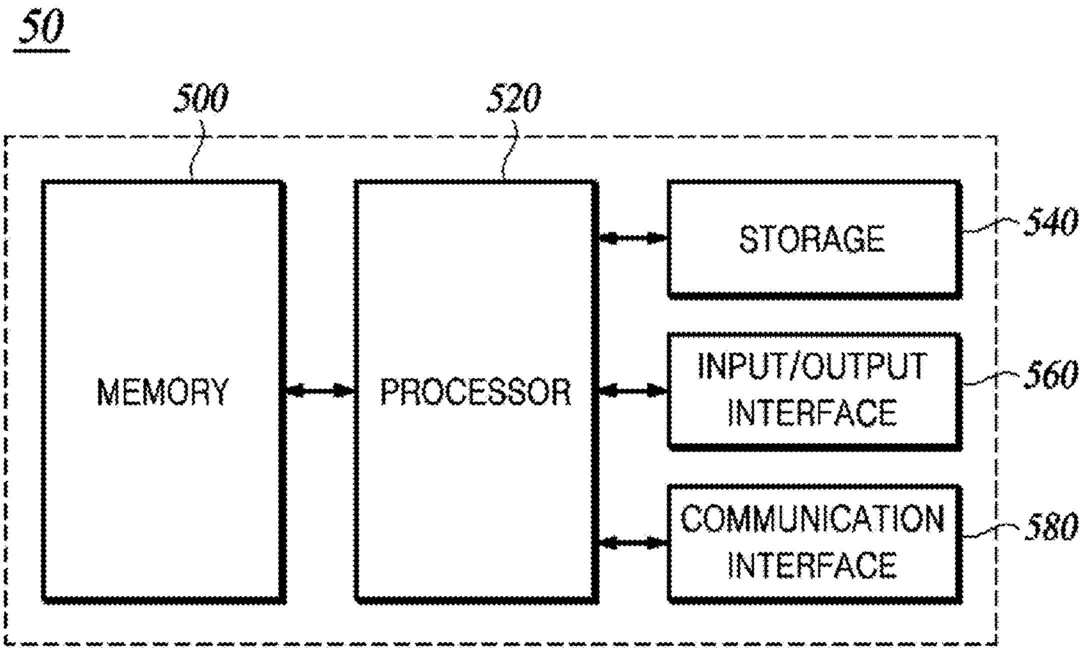
FIG. 5 is a block diagram schematically showing an exemplary computing device that may be used to realize a method or an apparatus according to the present disclosure.

FIG. 5 is a block diagram schematically showing an exemplary computing device that may be used to realize a method or an apparatus according to the present disclosure.

The computing device (50) may include some or all of a memory (500), a processor (520), a storage (540), an input/output interface (560), and a communication interface (580). The computing device (50) may be not only a stationary computing device such as a desktop computer, a server, and the like, but also a mobile computing device such as a laptop computer, a smart phone, and the like.

The memory (500) may store a program that causes the processor (520) to perform a method or an operation according to various embodiments of the present disclosure. For example, the program may include a plurality of instructions executable by the processor (520), and the above-described method or operation may be performed in such a manner that the plurality of instructions are executed by the processor (520). The memory (500) may be a single memory or a plurality of memories. In this case, information required for performing the method or the operation according to various embodiments of the present disclosure may be stored in the single memory or may be divided and stored in the plurality of memories. When the memory (500) includes the plurality of memories, the plurality of memories may be physically separated. The memory (500) may include at least one of a volatile memory and a nonvolatile memory. The volatile memory includes a static random access memory (SRAM), a dynamic random access memory (DRAM), or the like, and the nonvolatile memory includes a flash memory or the like.

The processor (520) may include at least one core which may execute at least one of the instructions. The processor (520) may execute the instructions stored in the memory (500). The processor (520) may be a single processor or a plurality of processors.

The storage (540) maintains stored data even when power supplied to the computing device (50) is cut off. For example, the storage (540) may include the nonvolatile memory, and may include storage media such as a magnetic tape, an optical disk, and a magnetic disk. A program stored in the storage (540) may be loaded into the memory (500) before being executed by the processor (520). The storage (540) may store a file written in a programming language, and a program generated from the file by a compiler or the like may be loaded into the memory (500). The storage (540) may store data to be processed by the processor (520) and/or data processed by the processor (520).

The input/output interface (560) may provide an interface with an input device such as a keyboard, mouse, and the like, and/or an output device such as a display device, printer, and the like. A user may confirm a processing result of the processor (520) through the output device in such a manner that executing the program is triggered by the processor (520).

The communication interface (580) may provide an access to an external network. The computing device (50) may communicate with other devices through the communication interface (580).

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for testing forward collision-avoidance assist of a vehicle, the method comprising:
- receiving, by at least one processor, a test mode enter signal;
- adjusting, by the at least one processor, a detection reference to improve object recognition of the vehicle;
- changing, by the at least one processor, an operating condition for the forward collision-avoidance assist to operate the forward collision-avoidance assist in a situation in which the vehicle has a low collision risk; and
- confirming, by the at least one processor, whether the forward collision-avoidance assist is operated, by using the adjusted detection reference and the changed operating condition for the forward collision-avoidance assist.

2. The method of claim 1,
wherein changing the operating condition for the forward collision-avoidance assist includes changing a minimum operation vehicle speed.

3. The method of claim 2,
wherein changing the minimum operation vehicle speed includes completing a test mode when a current vehicle speed is lower than the minimum operation vehicle speed.

4. The method of claim 1,
wherein changing the operating condition for the forward collision-avoidance assist includes changing a reference time-to-collision (TTC).

5. The method of claim 4,
wherein changing the reference TTC includes setting multiple reference TTCs by distinguishing situations in which a collision is expected based on at least one of a distance between the vehicle and an object and a current speed of the vehicle.

6. The method of claim 1,
wherein confirming whether the forward collision-avoidance assist is operated includes determining whether the changed operating condition for the forward collision-avoidance assist is satisfied.

7. The method of claim 6,
wherein determining whether the changed operating condition for the forward collision-avoidance assist is satisfied includes completing a test mode when a test mode retention time elapses.

8. The method of claim 1,
wherein confirming whether the forward collision-avoidance assist is operated includes calculating a time-to-collision (TTC), based on at least one of external information and internal information of the vehicle.

9. The method of claim 1,
wherein confirming whether the forward collision-avoidance assist is operated includes determining a collision risk by comparing a calculated time-to-collision (TTC) and a reference TTC.

10. The method of claim 1,
wherein confirming whether the forward collision-avoidance assist is operated includes controlling the vehicle, based on a collision risk.

11. An apparatus for testing forward collision-avoidance assist of a vehicle, the apparatus comprising:
- at least one memory that stores instructions; and
- at least one processor,
- wherein the at least one processor executes the instructions for causing the at least one processor to:
- receive a test mode enter signal,
- adjust a detection reference to improve object recognition of the vehicle,
- change an operating condition for the forward collision-avoidance assist to operate the forward collision-avoidance assist in a situation in which the vehicle has a low collision risk, and
- confirm whether the forward collision-avoidance assist is operated, by using the adjusted detection reference and the changed operating condition for the forward collision-avoidance assist.

12. The apparatus of claim 11,
wherein changing the operating condition for the forward collision-avoidance assist includes changing a minimum operation vehicle speed.

13. The apparatus of claim 12,
wherein changing the minimum operation vehicle speed includes completing a test mode when a current vehicle speed is lower than the minimum operation vehicle speed.

14. The apparatus of claim 11,
wherein changing the operating condition for the forward collision-avoidance assist includes changing a reference time-to-collision (TTC).

15. The apparatus of claim 14,
wherein changing the reference TTC includes setting multiple reference TTCs by distinguishing situations in which a collision is expected based on at least one of a distance between the vehicle and an object and a current speed of the vehicle.

16. The apparatus of claim 11,
wherein confirming whether the forward collision-avoidance assist is operated includes determining whether the changed operating condition for the forward collision-avoidance assist is satisfied.

17. The apparatus of claim 16,
wherein determining whether the changed operating condition for the forward collision-avoidance assist is satisfied includes completing a test mode when a test mode retention time elapses.

18. The apparatus of claim 11, wherein confirming whether the forward collision-avoidance assist is operated includes calculating a time-to-collision (TTC), based on at least one of external information and internal information of the vehicle.

19. The apparatus of claim 11, wherein confirming whether the forward collision-avoidance assist is operated includes determining a collision risk by comparing a calculated time-to-collision (TTC) and a reference TTC.

20. A non-transitory computer-readable recording medium storing computer-executable instructions that, when executed by at least one processor, cause the at least one processor to:

receive a test mode enter signal, adjust a detection reference to improve object recognition of the vehicle, change an operating condition for the forward collision-avoidance assist to operate the forward collision-avoidance assist in a situation in which the vehicle has a low collision risk, and confirm whether the forward collision-avoidance assist is operated, by using the adjusted detection reference and the changed operating condition for the forward collision-avoidance assist.

* * * * *